(12) United States Patent
Ngene-Igwe

(10) Patent No.: US 7,017,886 B1
(45) Date of Patent: Mar. 28, 2006

(54) SLIDING GATE VALVE

(76) Inventor: Romanus Aniekezie Ngene-Igwe, 2496 McGuffey Rd., Columbus, OH (US) 43211

( * ) Notice: Subject to any disclaimer, the term of this patent is extended or adjusted under 35 U.S.C. 154(b) by 33 days.

(21) Appl. No.: 10/802,302

(22) Filed: Mar. 17, 2004

(51) Int. Cl.
*F16K 3/00* (2006.01)

(52) U.S. Cl. .................................... 251/326

(58) Field of Classification Search ......... 251/326–329
See application file for complete search history.

(56) References Cited

U.S. PATENT DOCUMENTS

| | | | | |
|---|---|---|---|---|
| 2,242,467 A | * | 5/1941 | Hamer | 138/94.3 |
| 2,816,730 A | * | 12/1957 | Rabas | 251/328 |
| 2,913,220 A | * | 11/1959 | Cover | 251/328 |
| 3,946,739 A | * | 3/1976 | Berman et al. | 604/128 |
| 4,210,308 A | * | 7/1980 | Sims | 251/31 |
| 4,331,268 A | * | 5/1982 | Chisholm | 222/361 |
| 6,375,157 B1 | | 4/2002 | Van de Lande | 251/327 |
| 6,655,660 B1 | | 12/2003 | Wales | 251/319 |
| 6,712,789 B1 | | 3/2004 | Lange et al. | 604/164.02 |

* cited by examiner

*Primary Examiner*—J. Casimer Jacyna
(74) *Attorney, Agent, or Firm*—Standley Law Group LLP (57) ABSTRACT

A sliding gate valve, a sealing gasket for the valve, and a method of assembling the valve that may be used to govern the flow of a fluid such as a liquid or a gas. The sealing gasket may be characterized as having a circular portion, two connector portions, and a substantially curved portion that provides a seal discouraging fluid loss during use of the valve. Example fluids suitable for use with the valve include water, air, or oxygen. The fluids may or may not be pressurized as the valve provides a seal against leakage that is not dependent upon a pressure differential. Typical installations for the valve include, but are not limited to, household water supply systems, laboratory environments, and industrial settings.

20 Claims, 5 Drawing Sheets

SLIDING GATE VALVE

BACKGROUND AND SUMMARY OF THE INVENTION

The present invention relates to a gate valve, a sealing gasket for the valve, and a method of assembling the valve. More specifically, the present invention relates to a sliding gate valve such as may be used to govern the flow of a fluid such as a liquid or a gas. Example fluids suitable for use with the valve of the present invention include water, air, or oxygen. The fluids may or may not be pressurized as the valve of the present invention provides a seal against leakage that is not dependent upon a pressure differential. Typical installations for the valve of the present invention include, but are not limited to, household water supply systems, laboratory environments, and industrial settings.

The present invention is a sliding gate valve that may be comprised of a valve body having an inlet and an outlet, a cavity extending longitudinally through at least a portion of the valve body, a gate that is slidably moveable within the cavity, and at least one sealing gasket providing a seal between the gate and the cavity. Flow of a fluid through the valve is typically from an inlet to an outlet. Typically, the flow is generally transverse to the longitudinally extending cavity of the valve wherein the slidably movable gate can move to either an open or a closed position. Preferably, the sliding gate valve of the present invention is provided with a gate having a blocking portion and a conduit portion. Typically, flow through the valve does not occur if the blocking portion of the gate is aligned between the inlet and outlet of the valve. Typically, flow through the valve is able to occur if the conduit portion of the valve is aligned between the inlet and outlet of the valve.

The sealing gasket of the present invention discourages unintended releases of a fluid from the valve of the present invention. The sealing gasket provides a seal between a portion of the sliding gate and a portion of the cavity of the valve body. The sealing gasket may be a typical o-ring, such as an o-ring having a round cross-section. The sealing gasket of the present invention may be comprised of two separate sealing devices, such as a pair of concentric o-rings. In this embodiment, one of the o-rings would provide a seal between the cavity of the valve body and the perimeter of the conduit portion of the gate. The second o-ring would provide a seal between the cavity of the valve body and a perimeter surrounding the conduit portion and the blocking portion of the gate. In this manner, an unintended release of fluid from the valve of the present invention is discouraged, even as the position of the gate is slidably moved in the cavity between an open position and a closed position.

Preferred embodiments of the valve of the present invention may be comprised of a groove on a surface of the cavity adapted to receive at least a portion of the sealing gasket. Alternatively, embodiments of the valve of the present invention may be comprised of a groove on a surface of the gate that is adapted to receive at least a portion of the sealing gasket. A sealing gasket in either position would govern the seal between an opposing surface on the gate or the cavity, respectively. In addition, alternative embodiments of the present invention may have a second sealing gasket on a second surface of the cavity or the gate. This second sealing gasket would be positioned to govern a seal between a second opposing surface on the gate or the cavity, respectively. In addition, the second surface of the cavity or the gate may also be comprised of a groove adapted to receive at least a portion of the sealing gasket.

Alternative embodiments of the present invention may utilize one sealing gasket to produce a seal between a gate surface and its opposing cavity surface. A second sealing gasket may be used on the opposite side of the gate or cavity in order to produce a seal between its opposing cavity surface or gate surface, respectively. The singular sealing gasket in this embodiment may be comprised of a circular portion connected to at least one straight portion. Typically, the circular portion would extend around a perimeter of the conduit portion of the gate. An alternative embodiment provides for a sealing gasket comprised of a circular portion, at least one straight portion connected to the circular portion and a curved portion connected to the straight portion. Another alternative embodiment provides for a sealing gasket comprised of a circular portion, at least one straight portion connected to the circular portion and a substantially semicircular portion connected to the straight portion. Another alternative embodiment of the present invention provides for a sealing gasket comprised of a circular portion, at least one straight portion connected to the circular portion, at least one additional straight portion connected to the circular portion and a substantially semicircular portion having a first end and a second end. In this embodiment, the straight portions are tangential to the circular portion at their respective connections to the circular portion; in addition, the two straight portions are parallel. Additionally, the ends of the two straight portions are connected to opposite ends of the substantially semicircular portion.

Another embodiment of the sealing gasket of the present invention provides for a gasket comprised of a circular portion; first connector and second connector portions, each connected to the circular portion at their respective first ends; and a substantially curved portion having ends that are connected to one each of the second ends of the first and second connector portions. Another embodiment provides for a sealing gasket to surround both the perimeter of the conduit portion of the gate and the perimeter of the blocking portion. This embodiment is preferably a one-piece gasket that may have a portion of the gasket intended to isolate the respective perimeters of the conduit and the blocking portions. This sealing gasket may be comprised of any combination of curved or straight portions. For example, a sealing gasket of the present invention may be comprised of straight portions producing a shape resembling a blocked numeral eight. Alternatively, a sealing gasket may be comprised of circular portions sharing a common tangential border, thus resembling a pair of connected circles.

Any of the sealing gaskets of the present invention may be comprised of a material suitable for a use of the valve. For example, certain materials are more resistant to degradation in the presence of petroleum-based products. Examples of materials that may comprise the sealing gasket of the present invention include, but are not limited to: neoprene, rubber, isoprene, Teflon®, nitrile, silicone, fluoroelastomer such as Viton®, EPDM, EPM, styrene-butadiene, butyl, and CSM such as Hypalon® elastomer.

Portions of the sliding gate valve, such as the valve body and the gate, may be comprised of a material suitable for a particular use of the valve. As mentioned above, certain materials are more resistant to degradation in the presence of petroleum-based products. Examples of materials that may comprise the valve body or the gate of the present invention include, but are not limited to: plastic, PVC, CPVC, ABS plastic, polypropylene, polyethylene, metal, copper, aluminum, stainless steel, cast iron, and other typical piping and plumbing materials. The materials used for portions of the sliding gate valve may be manufactured using typical methods such as injection molding, casting, machine milling, and shaping.

Additionally, the valve may be comprised of at least one post operatively attached to an end of the sliding gate. If the valve has two posts, preferably the posts are attached to opposite ends of the gate. Typically, the posts may be used to move the gate between the open and closed positions for the valve. A post may additionally comprise an indicator of the position of an attached gate as an indicator of an open or closed valve. In addition, a post may be comprised of an end cap that may include an indicator of the gate position as an indicator of an open or closed valve. For example, a post or an end cap may include markings or printing of symbols or text on that element. Alternatively, a post or end cap may be colored to indicate a gate position. For example, a post or end cap may be colored green or red as an indicator of an open valve or closed valve, respectively.

The inlet and outlet of the valve of the present invention may be comprised of any typical pipe connection. Exemplary pipe connections include, but are not limited to: mechanical connections, threaded connections, sockets, Victaulic®, flanges, welded connections, glued connections, compression fittings, banded connections, swaged flangeless connections, hydraulic connections, and other plumbing connections.

A method of assembling an exemplary valve of the present invention is facilitated by two posts that are connected to opposing ends of a gate. The preferred gate of this example would be comprised of a pair of posts having different sizes and/or shapes. In this example, the valve body is additionally comprised of an aperture in the valve body that extends into the cavity allowing for the slidable assembly of the gate into the cavity. This aperture may be sealed with a cap or other similar device so that the sealed cavity secures the gate of the valve during its movement between an open or closed position. Preferably, the cap has an opening sized so as to provide a complementary fit for only one of the posts attached to the gate. Near an opposite end of the cavity, a second opening is provided that provides a complementary fit for the other post attached to the gate. During assembly, the gate is preferably installed by sliding it in a direction generally aligned with the longitudinal length of the cavity. Then, the cap or other sealing assembly is used to seal the aperture of the cavity. A correctly installed gate would have each of the posts on the gate installed in their respective complementary sized openings. As a result, the gate would be properly positioned for movement within the cavity that would preferably correspond with any exterior markings on the valve that indicate an open or closed state. In addition, by observation of the posts properly placed into complementary sized openings, the valve may be identified as having been properly assembled in the absence of any markings.

Alternatives to the different sized or shaped posts of an example embodiment of the present invention provide for a first post being smaller than a second post or a first post having a different cross-sectional shape than a second post. In this manner the method of assembly may be further specified by the use of the different posts. For example, if a first complementary sized opening near an end of the cavity—that is sized to fit a first post on the gate—is smaller than a second post on the gate; the second post will not fit into the first complementary sized opening. As a result, the proper assembly of the valve is dictated by requiring a reversal of the gate so that the properly fitted first post will be placed into the first complementary sized opening. Then, the cap or other sealing device can be placed over the aperture in the valve body. In turn, the second larger post will be properly accommodated in a second complementary sized opening in the cap, thus producing a properly assembled embodiment of the sliding gate valve of the present invention.

An alternative method of assembly of the valve of the present invention provides for the assembly of two portions of a valve body formerly separated in the vicinity of the cavity of the valve to allow for installation of the gate. Preferably, the former separation between the two portions of the valve body would not be in the area of a sealing surface between the cavity and the gate. An exemplary embodiment of the valve of the present invention assembled by this method may use two nearly symmetrical portions of the valve body that would have been separated along a longitudinal plane that follows the cavity of the valve. The portions of the valve body may be sealed together by a mechanical seal or supplemented by additional sealing means such as gaskets, glues, epoxies, welding, clamps, bands, screws, or bolts. The portions of the valve body may also use pins or other means of guiding and assuring a proper assembly of the valve body portions.

BRIEF DESCRIPTION OF THE DRAWINGS

In addition to the novel features and advantages mentioned above, other objects and advantages of the present invention will be readily apparent from the following descriptions of the drawings and preferred embodiments.

DETAILED DESCRIPTION OF THE EXEMPLARY EMBODIMENT(S)

The exemplary embodiments discussed below are preferably made from a plastic material. Preferred embodiments of at least portions of the present invention may be manufactured via an injection molded plastic process. In addition to plastic, at least portions of the present invention may be made from other similar material including plastic-containing compounds. At least portions of the present invention may be manufactured from metals, such as aluminum, copper, or steel. In addition, portions of the present invention may be manufactured from materials comprising: neoprene, rubber, isoprene, Teflon®, nitrile, silicone, fluoroelastomer such as Viton®, EPDM, EPM, styrene-butadiene, butyl, and CSM such as Hypalon® elastomer. Other suitable materials for use in the manufacture of alternative embodiments include those materials well known in the art for piping and plumbing components.

Figure 1:
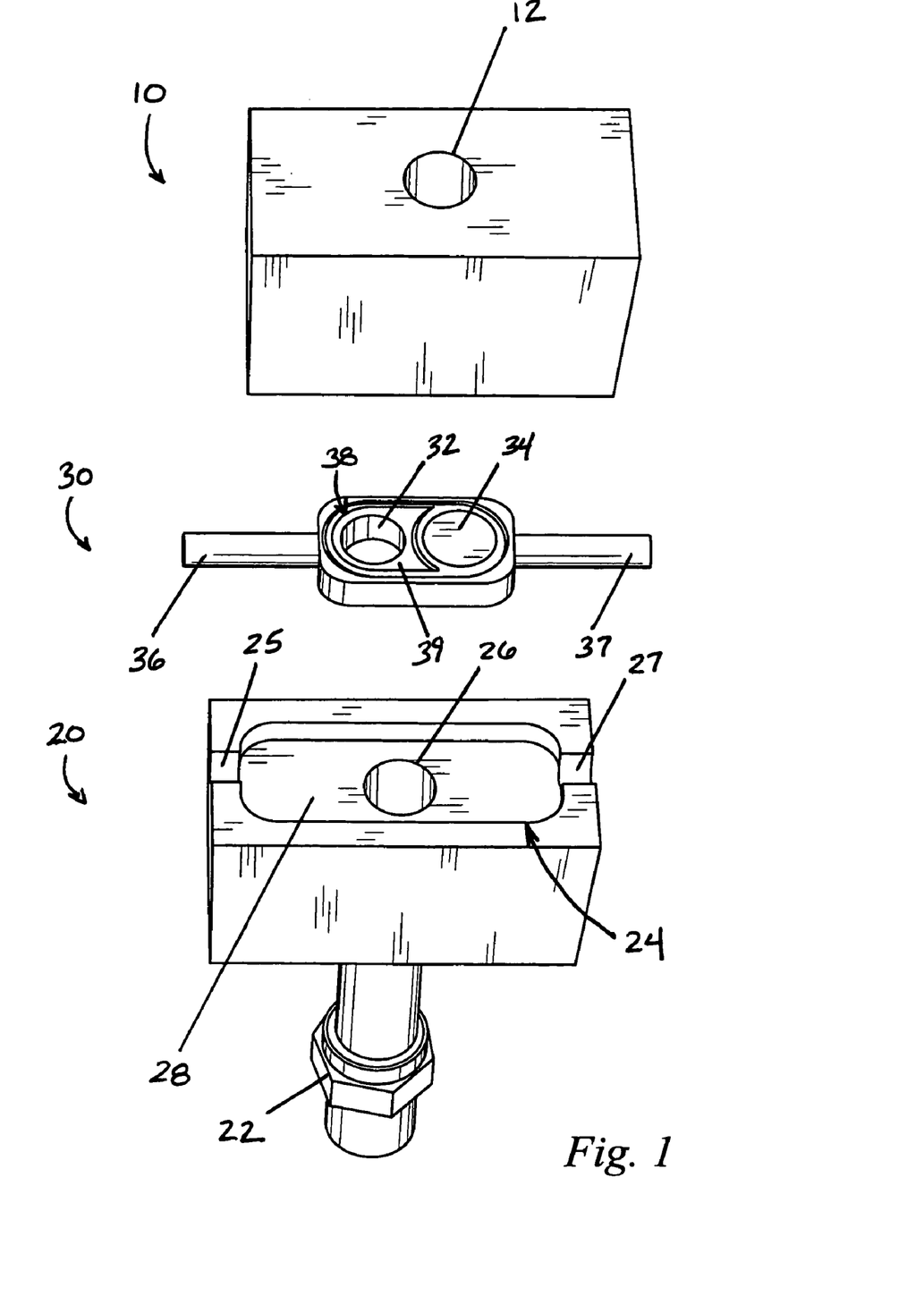
FIG. 1 is a perspective view of an exploded version of an embodiment of the present invention.

An exemplary embodiment of a valve of the present invention is shown in an exploded view at FIG. 1. A first portion 10 and a second portion 20 of a valve body are shown with an embodiment of a gate 30 of the present invention. An inlet 12 to the valve is shown as an exemplary receptacle for a glued connection with a pipe (not shown). Alternatively, an outlet 22 of the valve is shown having an exemplary plumbing connection such as may be associated with a compression fitting. As noted previously, exemplary pipe connections for the inlet and outlet of the valve include, but are not limited to: mechanical connections, threaded connections, sockets, Victaulic®, flanges, welded connections, glued connections, compression fittings, banded connections, swaged flangeless connections, hydraulic connections, and other plumbing connections.

The second portion 20 of the valve body shows a cavity 24 extending longitudinally through at least a portion of the valve body. The cavity 24 shows the outlet 22 of the valve as being in fluid communication via a passage that is comprised of the opening shown at 26. Although it is hidden on this view of the first portion 10 of the valve body, the passage is generally aligned between the inlet 12 and the outlet 22 so that a flow of fluid through the valve is generally transverse to the longitudinal extension of the cavity 24. In addition, with respect to the conduit portion 32 of the gate 30, the assembled valve is intended to provide a passage for flow of a fluid through the valve when the conduit portion 32 of the gate 30 is aligned with the inlet 12 and outlet 22 of the valve. The aligned relationship between the conduit portion 32 and the inlet 12 and the outlet 22 is associated with the valve being in an open position. Alternatively, a passage for flow through the valve is interrupted and thusly described as being in a closed position when the blocking portion 34 is generally aligned with the inlet 12 and outlet 22 of the valve.

The gate 30 is shown as having a generally complementary shape that is slidably moveable along the longitudinal length of the cavity 24. In addition, the gate 30 is shown having a first post 36 and a second post 37 connected to opposite ends of the gate 30. The posts, 36 and 37, provide for the operative movement of the gate 30 within the cavity 24 when the posts are moved. The posts, 36 and 37, may be the same size and/or shape. In addition, the post 36 may alternatively have a different size than post 37, such as might be associated with a different outside diameter. Another alternative embodiment of the present invention provides for the post 36 having a different cross-sectional shape than post 37. The distinguishably shaped or sized posts would have a complementary fit with their respective openings in the valve body as shown in the vicinity of the ends of the cavity 24 at 25 and 27. Either alternative embodiment with respect to the posts provides for assistance in assuring a properly assembled valve.

At least one sealing gasket provides a seal between the gate 30 and the cavity 24. Alternative embodiments of sealing gaskets are shown in subsequent figures. As shown on the gate 30, a groove 38 is adapted to receive at least a portion of the sealing gasket. In this manner, the groove 38 can facilitate the use of the sealing gasket to maintain a seal between a surface of the gate 30, such as is shown at 39, and a surface of the cavity 24, such as shown at 28. As shown in FIG. 1, a sealing gasket in the groove 38 of the surface 39 of the gate 30 would effect a seal against the surface 28 of the cavity 24 only if the gate was rotated 180° such that the surfaces 39 and 28 were in a face-to-face relationship.

As can be seen with the shape of the groove 38, an exemplary sealing gasket of the present invention that has a complementary fit with the groove 38 would provide a portion of the sealing gasket that extends around a perimeter of the conduit portion at 32 and a portion that extends around a perimeter of the blocking portion at 34 of the gate.

Figure 2:
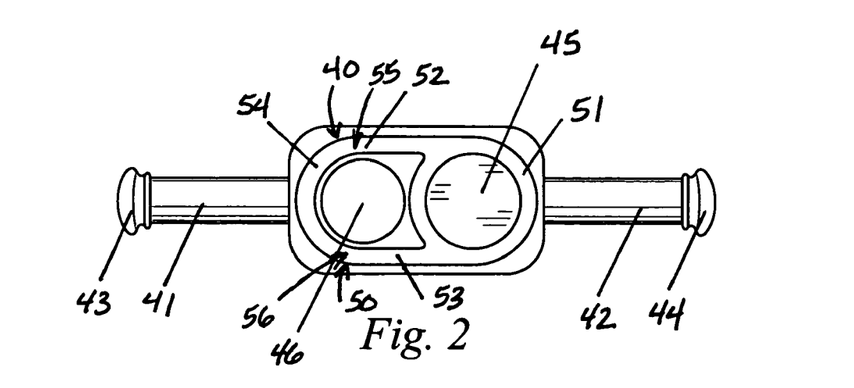
FIG. 2 is a top elevational view of a gate and sealing gasket of an embodiment of the present invention.

FIG. 2 shows an embodiment of the gate of the present invention at 40. As described previously, the gate 40 has posts 41 and 42. In addition, gate 40 is provided with end caps 43 and 44 that may assist with operation of the valve by providing a comfortable place for the contact and operation of a valve by an operator. In addition, the posts, 41 and 42, or the end caps, 43 and 44, may be marked and/or colored so as to indicate a gate position on an assembled valve. For example, a post or end cap may be colored green or red as an indicator of an open valve or a closed valve, respectively.

FIG. 2 shows an embodiment of a sealing gasket 50 of the present invention. As shown, the sealing gasket 50 is comprised of a circular portion 51, a first straight portion 52 connected to the circular portion 51, a second straight portion 53 connected to the circular portion 51, and a substantially semicircular portion 54 having a first end 55 and a second end 56. In this embodiment, the straight portions, 52 and 53, are tangential to the circular portion at their respective connections to the circular portion 51; in addition, the two straight portions, 52 and 53, are parallel. Additionally, the ends of the two straight portions, 52 and 53, are each connected to an end of the substantially semicircular portion 54, such as is shown at 55 or 56. It should be noted that although the present embodiment of the sealing gasket shows the circular portion 51 providing a seal around the perimeter of the blocking portion 45 of the gate 40, alternative embodiments of the present invention provide for a circular portion to provide a seal around the conduit portion 46 of the gate by extending around its respective perimeter.

Figure 3A:
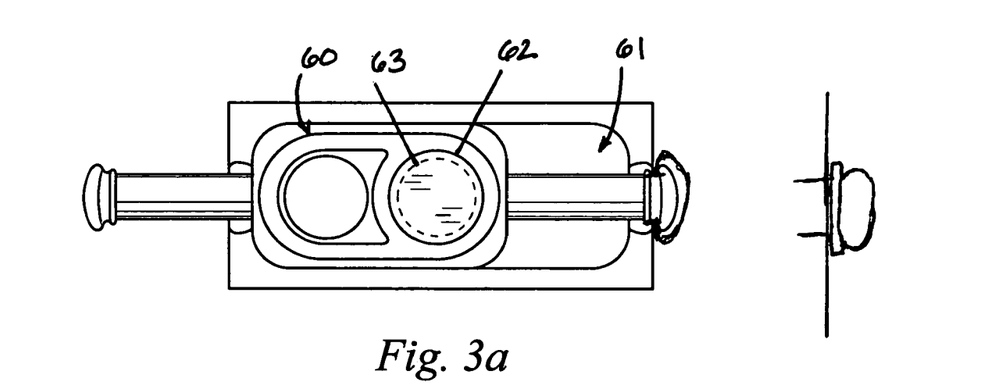
FIG. 3a is a top elevational view of a gate and a portion of a cavity a valve body of an embodiment of the present invention.
Figure 3B:
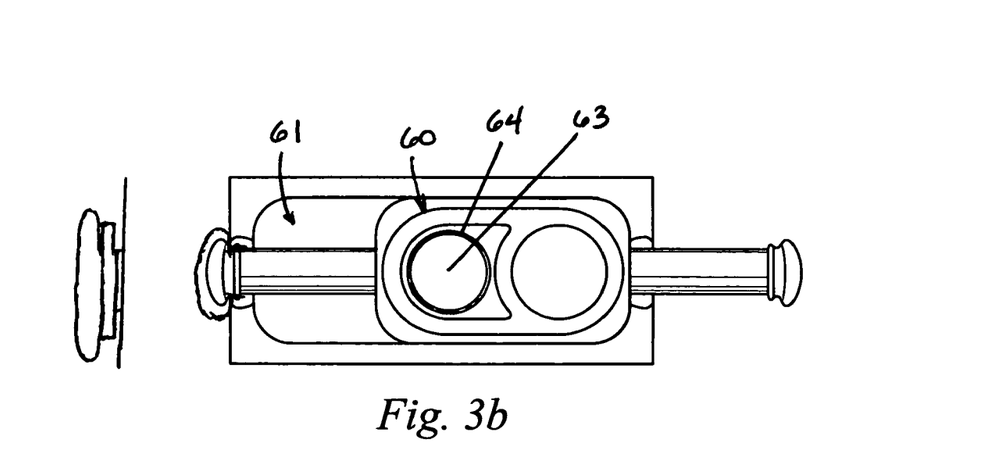
FIG. 3b is a top elevational view of a gate and a portion of a cavity a valve body of an embodiment of the present invention

FIGS. 3a and 3b show the slidable movement of a gate 60 within a cavity 61 of a valve body. In particular, FIG. 3a shows the general alignment of the blocking portion 62 with the passage 63 for fluid through the valve. In this position, the valve would be in a closed condition. As shown at FIG. 3b, the general alignment of the conduit portion 64 with the passage 63 for fluid through the valve places the valve in an open condition.

Figure 4:
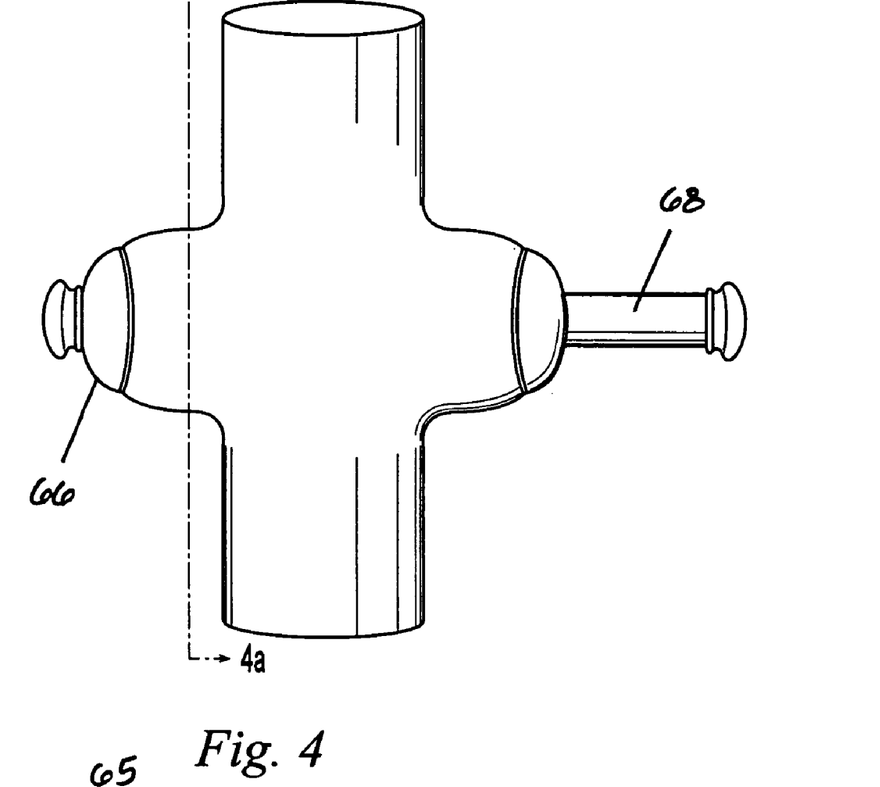
FIG. 4 is a side elevational view of an embodiment of the present invention.
Figures 4, 4A:
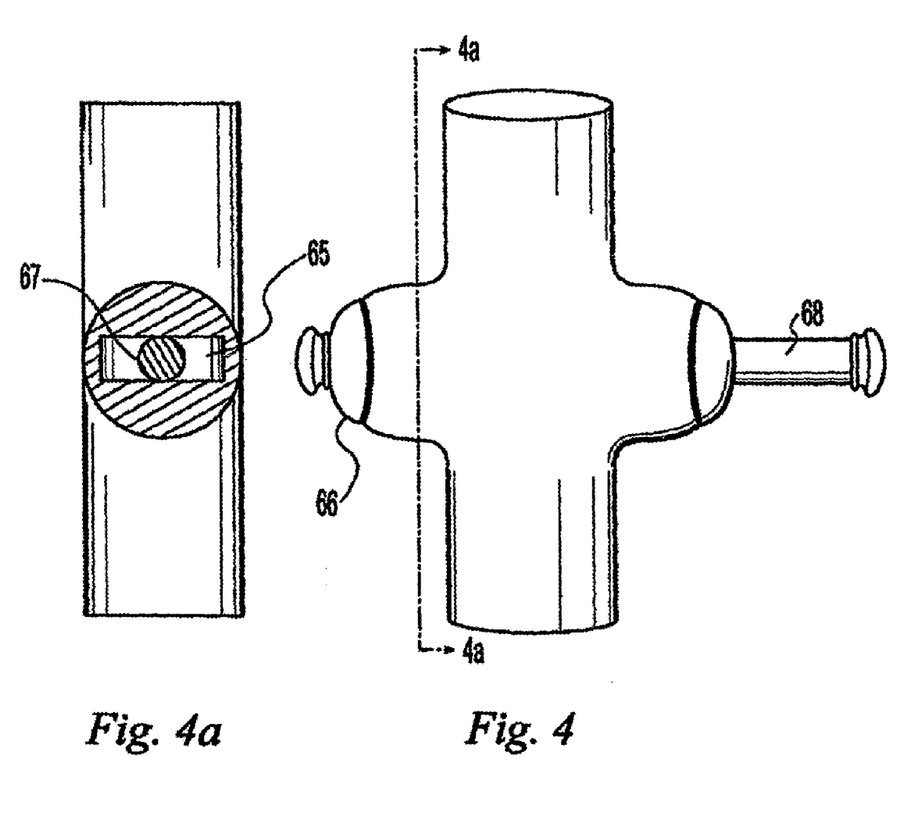
FIG. 4a is a cross-sectional view of a valve body of an embodiment of the present invention showing an exemplary aperture.
Figure 4A:
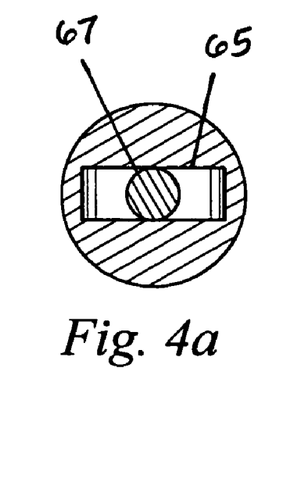

FIG. 4 shows an alternative embodiment of a valve of the present invention. FIG. 4a shows a cross-sectional view of the valve, particularly to illustrate an exemplary aperture 65. As described previously, the aperture 65 may be accessible by removal of a cap 66. The aperture 65 extends into the cavity of the valve, allowing for the slidable assembly a gate into the cavity. The aperture 65 is sealed by the cap 66 after insertion of a gate into the cavity. In addition, an opening in the valve body 67 and an opening in the cap each provide a complementary fit for their respective posts, e.g. 68, of a gate. As discussed previously, the openings and the posts may be distinguished by different shape and/or size.

Figure 5A:
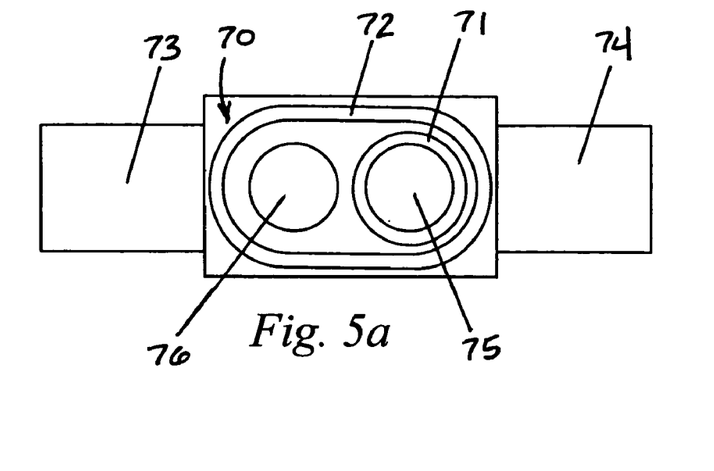
FIG. 5a is a top elevational view of a gate and gasket of an embodiment of the present invention.
Figure 5B:
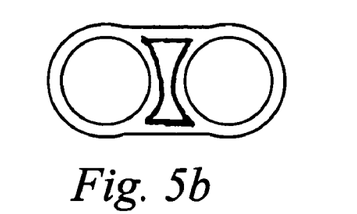
FIG. 5b is a top elevational view of a gasket of an embodiment of the present invention.
Figure 5C:
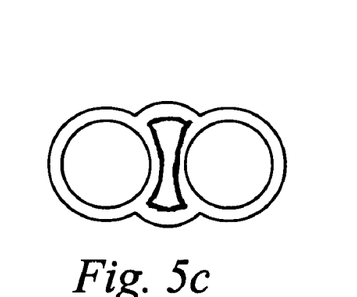
FIG. 5c is a top elevational view of a gasket of an embodiment of the present invention.
Figure 5D:
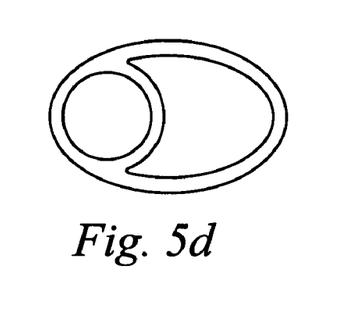
FIG. 5d is a top elevational view of a gasket of an embodiment of the present invention.

FIG. 5a shows an alternative embodiment of the gate 70 and a pair of sealing gaskets at 71 and 72. In addition, the gate 70 is shown as having posts 73 and 74. As shown in the present embodiment, the sealing gaskets 71 and 72 may be described as a pair of concentric o-rings. In this embodiment, one sealing gasket 71 would provide a seal between the cavity of the valve body and the perimeter of the blocking portion 75 of the gate 70. The second sealing gasket 72 would provide a seal between the cavity of the valve body and a perimeter surrounding the blocking portion 75 and the conduit portion 76 of the gate 70. In this manner, an unintended release of fluid from the valve of the present invention is discouraged, even as the position of the gate is slidably moved in the cavity between an open position and a closed position.

FIGS. 5b, 5c, 5d, and 6a show alternative embodiments of the sealing gasket of the present invention. As described previously, the sealing gasket may be comprised of circular portions, semicircular portions, curved portions, or straight portions.

Figure 6A:
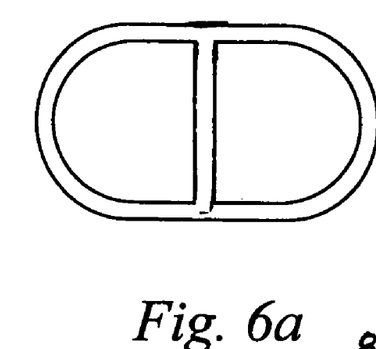
FIG. 6a is a top elevational view of a gasket of an embodiment of the present invention.
Figure 6B:
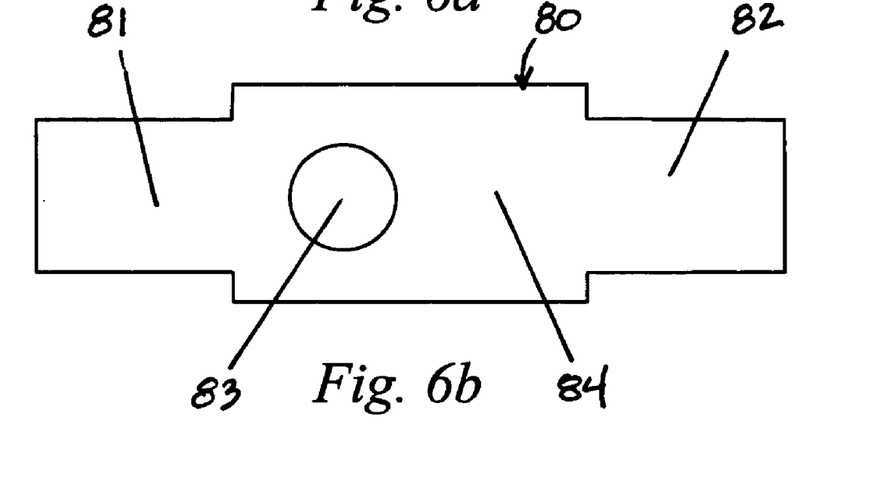
FIG. 6b is a top elevational view of a gate of an embodiment of the present invention.
Figure 6C:
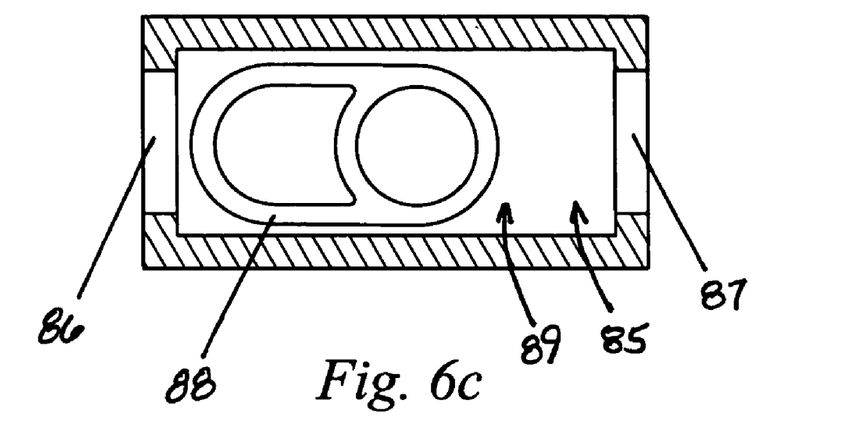
FIG. 6c is a top cross-sectional view of a valve body of an embodiment of the present invention showing an exemplary cavity.

FIG. 6b shows a gate 80 of an embodiment of the present invention. The gate is shown with posts, 81 and 82, a conduit portion 83, and a blocking portion 84. Notably, the present embodiment of the gate does not have a groove adapted to receive a sealing gasket. Instead, as shown in FIG. 6c, a portion of a valve body is illustrated to show a cavity 85. As can be observed in the present embodiment, the cavity 85 has openings, 86 and 87, in the vicinity of the ends of the cavity and a sealing gasket 88 is shown in a surface 89 of the cavity 85. As a result, a seal is provided by the sealing gasket 88 between a surface of the gate 80 and a surface 89 in the cavity. As described previously, the sealing gasket allows for the slidable movement of the gate 80 while still maintaining a seal and discouraging an unintended release of a fluid. In addition, the surface 89 may be comprised of a groove to receive the sealing gasket 88.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

I claim:

1. A sliding gate valve, said valve comprised of:
   a valve body having an inlet and an outlet;
   a cavity extending longitudinally through at least a portion of said valve body, wherein said cavity is in fluid communication with said inlet and said outlet;
   a gate slidably moveable within said cavity, said gate having a blocking portion, a conduit portion, a first post, and a second post, said first post connected to a first end of said gate, and said second post connected to a second end of said gate;
   a first sealing gasket in contact with a first surface of said cavity and a first surface of said gate;
   wherein said first end of said gate is on an end opposite said second end of said gate;
   wherein movement of said first post or said second post operatively moves said slidably movable gate within said cavity;
   wherein said first post is smaller than said second post;
   wherein a first portion of said first sealing gasket extends around a perimeter of said conduit portion;
   wherein a second portion of said first sealing gasket extends around a perimeter of said blocking portion;
   wherein a flow of a fluid between said inlet and said outlet is generally transverse to said longitudinal extension of said cavity; and
   wherein a passage for said flow of a fluid through said valve is provided when said conduit portion of said gate is aligned with said inlet and said outlet.

2. The valve of claim 1, said valve additionally comprising a groove on said first surface of said gate, wherein said groove is adapted to receive at least a portion of said first sealing gasket.

3. The valve of claim 1, wherein said first sealing gasket has a round cross-section.

4. The valve of claim 1, wherein said first sealing gasket is comprised of:
   a circular portion; and
   at least one straight portion connected to said circular portion.

5. The valve of claim 4, wherein said circular portion extends around said perimeter of said conduit portion of said gate.

6. The valve of claim 4, wherein said first sealing gasket is additionally comprised of a curved portion connected to said at least one straight portion.

7. The valve of claim 4, wherein said first sealing gasket is additionally comprised of a substantially semicircular portion connected to said at least one straight portion.

8. The valve of claim 4, wherein said first sealing gasket is additionally comprised of:
   at least one additional straight portion connected to said circular portion; and
   a substantially semicircular portion having a first end and a second end;
   wherein said at least one straight portion is tangential to said circular portion at said connection to said circular portion;
   wherein said at least one additional straight portion is tangential to said circular portion at said connection to said circular portion;
   wherein said at least one straight portion is parallel to said at least one additional straight portion;
   wherein said first end of said substantially semicircular portion is connected to an end of said at least one straight portion; and
   wherein said second end of said substantially semicircular portion is connected to an end of said at least one additional straight portion.

9. A sliding gate valve, said valve comprised of:
   a valve body having an inlet and an outlet;
   a cavity extending longitudinally through at least a portion of said valve body, wherein said cavity is in fluid communication with said inlet and said outlet;
   a gate slidably moveable within said cavity, said gate having a blocking portion, a conduit portion, a first post, and a second post, said first post connected to a first end of said gate, and said second post connected to a second end of said gate;
   a first sealing gasket in contact with a first surface of said cavity and a first surface of said gate;
   wherein said first end of said gate is on an end opposite said second end of said gate;

wherein movement of said first post or said second post operatively moves said slidably movable gate within said cavity;

wherein said first post has a different cross-sectional shape than said second post;

wherein a first portion of said first sealing gasket extends around a perimeter of said conduit portion;

wherein a second portion of said first sealing gasket extends around a perimeter of said blocking portion;

wherein a flow of a fluid between said inlet and said outlet is generally transverse to said longitudinal extension of said cavity; and wherein a passage for said flow of a fluid through said valve is provided when said conduit portion of said gate is aligned with said inlet and said outlet.

10. The valve of claim 9, said valve additionally comprising a groove on said first surface of said gate, wherein said groove is adapted to receive at least a portion of said first sealing gasket.

11. The valve of claim 9, wherein said first sealing gasket is comprised of:
a circular portion; and
at least one straight portion connected to said circular portion.

12. The valve of claim 11, wherein said circular portion extends around said perimeter of said conduit portion of said gate.

13. The valve of claim 11, wherein said first sealing gasket is additionally comprised of a curved portion connected to said at least one straight portion.

14. The valve of claim 11, wherein said first sealing gasket is additionally comprised of a substantially semicircular portion connected to said at least one straight portion.

15. A sliding gate valve, said valve comprised of:
a valve body having an inlet, an outlet, a first opening, and a second opening;
a cavity extending longitudinally through at least a portion of said valve body, wherein said cavity is in fluid communication with said inlet and said outlet;
a gate slidably moveable within said cavity, said gate having a blocking portion, a conduit portion, a first post, and a second post, said first post connected to a first end of said gate, and said second post connected to a second end of said gate;
a first sealing gasket in contact with a first surface of said cavity and a first surface of said gate;

wherein said first opening provides a complementary fit for said first post;

wherein said second opening provides a complementary fit for said second post;

wherein said first end of said gate is on an end opposite said second end of said gate;

wherein movement of said first post or said second post operatively moves said slidably movable gate within said cavity;

wherein a first portion of said first sealing gasket extends around a perimeter of said conduit portion;

wherein a second portion of said first sealing gasket extends around a perimeter of said blocking portion;

wherein a flow of a fluid between said inlet and said outlet is generally transverse to said longitudinal extension of said cavity; and wherein a passage for said flow of a fluid through said valve is provided when said conduit portion of said gate is aligned with said inlet and said outlet.

16. The valve of claim 15, wherein said first opening of said valve body is smaller than said second opening in said valve body such that said second post of said gate will not have a complementary fit with said first opening.

17. The valve of claim 15, wherein said first sealing gasket is comprised of:
a circular portion; and
at least one straight portion connected to said circular portion.

18. The valve of claim 17, wherein said circular portion extends around said perimeter of said conduit portion of said gate.

19. The valve of claim 17, wherein said first sealing gasket is additionally comprised of a curved portion connected to said at least one straight portion.

20. The valve of claim 17, wherein said first sealing gasket is additionally comprised of a substantially semicircular portion connected to said at least one straight portion.

* * * * *

UNITED STATES PATENT AND TRADEMARK OFFICE
CERTIFICATE OF CORRECTION

| | | |
|---|---|---|
| PATENT NO. | : 7,017,886 B1 | Page 1 of 7 |
| APPLICATION NO. | : 10/802302 | |
| DATED | : March 28, 2006 | |
| INVENTOR(S) | : Ngene-Igwe | |

It is certified that error appears in the above-identified patent and that said Letters Patent is hereby corrected as shown below:

Drawing sheets, consisting of Figs. 1-6c should be deleted to be replaced with the drawing sheets consisting of Figs. 1-6c, as shown on the attached pages.

Illustrative figure on the title page should be deleted and replaced with Fig. 1, as shown on the attached page.

Signed and Sealed this

Fourteenth Day of November, 2006

JON W. DUDAS
*Director of the United States Patent and Trademark Office*

(12) United States Patent
Ngene-Igwe (10) Patent No.: US 7,017,886 B1
(45) Date of Patent: Mar. 28, 2006

(54) SLIDING GATE VALVE (76) Inventor: Romanus Aniekezie Ngene-Igwe, 2496 McGuffey Rd., Columbus, OH (US) 43211

( * ) Notice: Subject to any disclaimer, the term of this patent is extended or adjusted under 35 U.S.C. 154(b) by 33 days.

(21) Appl. No.: 10/802,302

(22) Filed: Mar. 17, 2004

(51) Int. Cl.
F16K 3/00 (2006.01)
(52) U.S. Cl. .................................... 251/326
(58) Field of Classification Search ......... 251/326–329
See application file for complete search history.

(56) References Cited

U.S. PATENT DOCUMENTS

| | | | |
|---|---|---|---|
| 2,242,467 A * | 5/1941 | Hamer | 138/94.3 |
| 2,815,730 A * | 12/1957 | Rabas | 251/328 |
| 2,913,220 A * | 11/1959 | Cover | 251/328 |
| 3,946,739 A * | 3/1976 | Berman et al. | 604/128 |
| 4,210,308 A * | 7/1980 | Sims | 251/31 |
| 4,331,268 A * | 5/1982 | Chisholm | 222/361 |
| 6,375,157 B1 | 4/2002 | Van de Lande | 251/327 |
| 6,655,660 B1 | 12/2003 | Wales | 251/319 |
| 6,712,789 B1 | 3/2004 | Lange et al. | 604/164.02 |

* cited by examiner

Primary Examiner—J. Casimer Jacyna
(74) Attorney, Agent, or Firm—Standley Law Group LLP (57) ABSTRACT A sliding gate valve, a sealing gasket for the valve, and a method of assembling the valve that may be used to govern the flow of a fluid such as a liquid or a gas. The sealing gasket may be characterized as having a circular portion, two connector portions, and a substantially curved portion that provides a seal discouraging fluid loss during use of the valve. Example fluids suitable for use with the valve include water, air, or oxygen. The fluids may or may not be pressurized as the valve provides a seal against leakage that is not dependent upon a pressure differential. Typical installations for the valve include, but are not limited to, household water supply systems, laboratory environments, and industrial settings.

20 Claims, 5 Drawing Sheets